United States Patent [19]

Okamura et al.

[11] 4,291,800
[45] Sep. 29, 1981

[54] TAPE CASSETTE

[75] Inventors: Masatoshi Okamura; Haruo Shiba, both of Saku, Japan

[73] Assignee: TDK Electronics, Tokyo, Japan

[21] Appl. No.: 79,193

[22] Filed: Sep. 26, 1979

[30] Foreign Application Priority Data

Nov. 24, 1978 [JP] Japan .................... 53-160730

[51] Int. Cl.³ .......................................... B65D 85/672
[52] U.S. Cl. ..................................... 206/387; 206/389
[58] Field of Search .................. 206/387, 389; 220/8, 220/352, 307

[56] References Cited

U.S. PATENT DOCUMENTS 4,101,030 7/1978 Kroeber .............................. 206/387

FOREIGN PATENT DOCUMENTS 220847 4/1962 Austria .................................. 206/387
685825 12/1939 Fed. Rep. of Germany ...... 206/387

Primary Examiner—Joseph Man-Fu Moy
Attorney, Agent, or Firm—Oblon, Fisher, Spivak, McClelland & Maier

[57] ABSTRACT

The tape cassette comprises a guide rib extending upward from a lower casing to form a supporting surface for the entire width of the magnetic tape and a guide rib extending downward from an upper casing along the rear surface of the guide rib of the lower casing to provide a support for the guide rib of the lower casing.

5 Claims, 4 Drawing Figures

TAPE CASSETTE

BACKGROUND OF THE INVENTION

1. Field of the Invention

The present invention relates to a magnetic tape cassette. More particularly, it relates to an improvement of the structure of the front part of a video tape cassette.

2. Description of the Prior Art

Heretofore, two kinds of magnetic video tape cassettes have been known.

In the conventional tape cassettes, the VHS type video tape cassette has a structure shown in FIG. 1. That is, a lower casing (1) and an upper casing (2) are molded so as to form an assembled casing. A magnetic tape wound on a winding hub (not shown) is placed in the assembled casing and then the lower casing and the upper casing are screwed together. A mechanism for guiding the magnetic tape outside is provided at the front part of the lower casing and the upper casing respectively. A pin (3) for drawing the magnetic tape outside is provided at a side of the front part of the lower casing (1) and another pin (4) for taking the magnetic tape inside is provided at the other side of the front part of the lower casing (1) and a pair of guide ribs (5) are formed between the pins (4) and (5). Each guide rib has a projecting bead (6) at its lower edge so that the lateral movement of the magnetic tape (vertical direction in the drawing) can be prevented. The surface of the rib (5) is formed in a vertical plane to guide the magnetic tape. Similarly, a pair of guide ribs (7), (7), and outlet (8) of the magnetic tape and an inlet (9) of the magnetic tape are formed at the front part of the upper casing. The guide ribs (5) and (7) are formed in such a manner that the faced ends of both guide ribs just fit at the central plane formed in the assembled casing as shown in FIG. 2. The magnetic tape (T) is guided by a vertical surface formed by both guide ribs (5), (7).

In the conventional tape cassette, serious difficulty has been found in assembling the casings. That is, in the course of the assembling operation in which the magnetic tape wound on the winding hub is placed in the predetermined position of the lower casing (1) and a part of the magnetic tape is taken out from the area of the pins (3) and (4) to pass in front of the guide ribs (5), (5) and the upper casing (2) is laid over the lower casing (1) as shown in FIG. 2, the magnetic tape is often bitten, snagged or pinched between the faced ends of the guide rib (5) and the guide rib (7) since the magnetic tape (T) extends over the central plane (11).

SUMMARY OF THE INVENTION

It is an object of the present invention to provide an improved tape cassette free from the biting, snagging or pinching of the magnetic tape when the upper casing is assembled on the lower casing.

The foregoing and other objects of the present invention have been attained by providing a tape cassette having a guide rib of the lower casing having the width being at least slightly larger than that of the magnetic tape, the rear surface of guide rib being supported by the guide rib of the upper casing extending downward.

DETAILED DESCRIPTION OF THE PREFERRED EMBODIMENT

Figure 1:
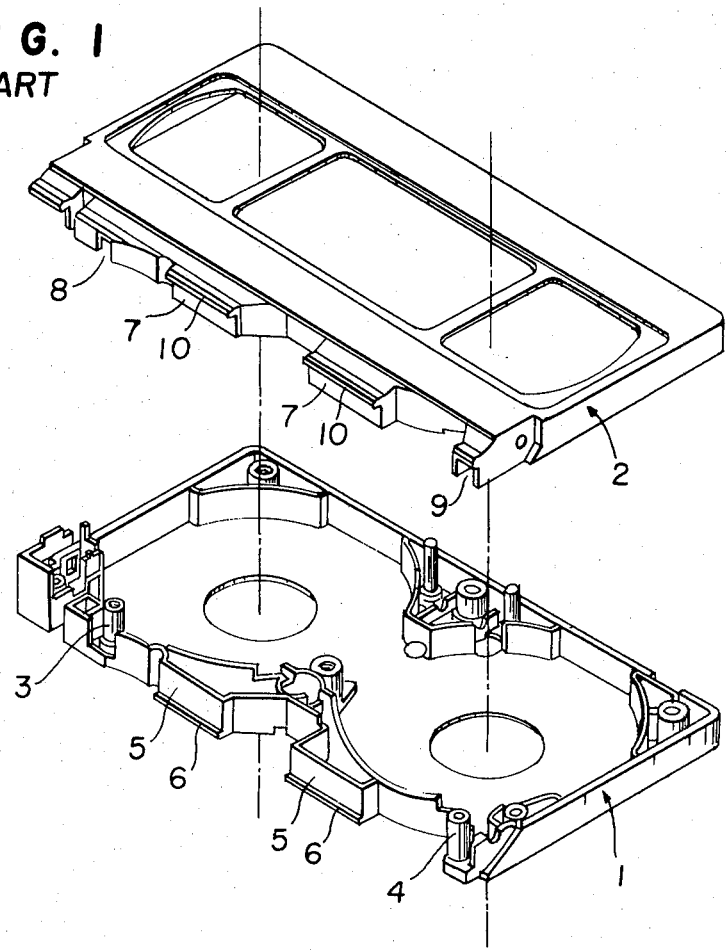
FIG. 1 is an exploded slant view of the conventional tape cassette.
Figure 2:
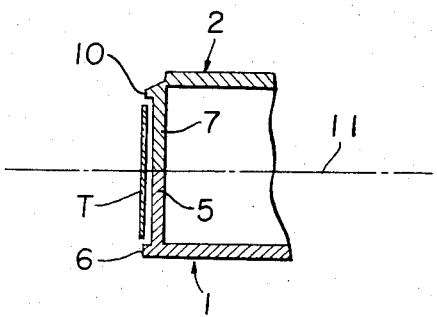
FIG. 2 is an enlarged sectional view of the guide rib of the tape cassette of FIG. 1.
Figure 3:
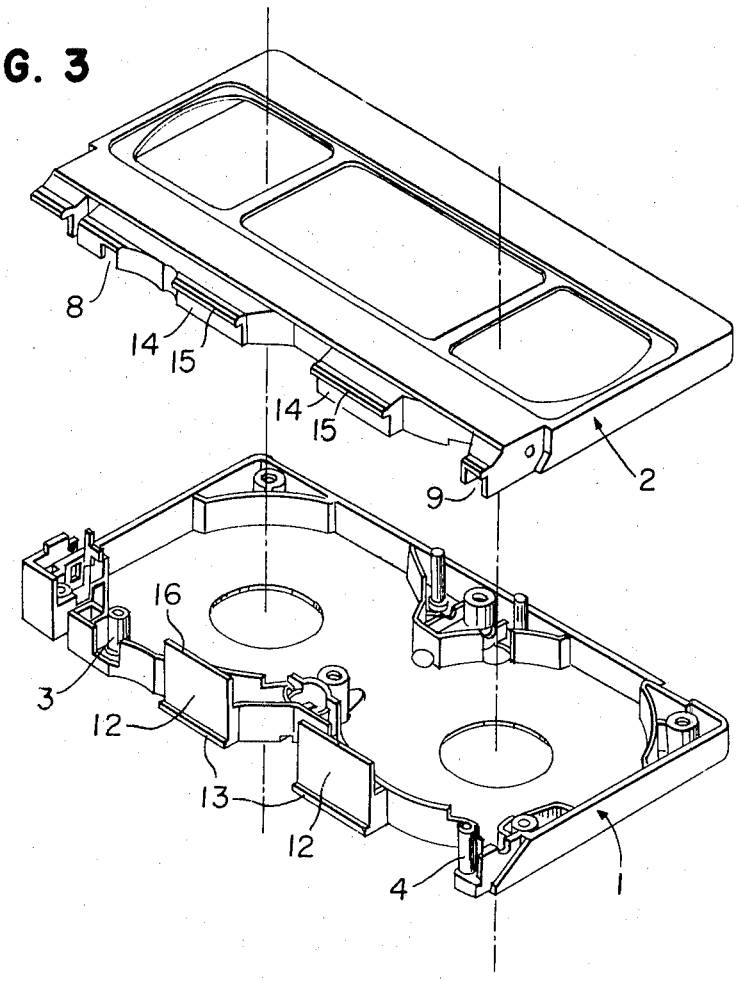
FIG. 3 is an exploded slant view of an embodiment of a video tape cassette according to the present invention.
Figure 4:
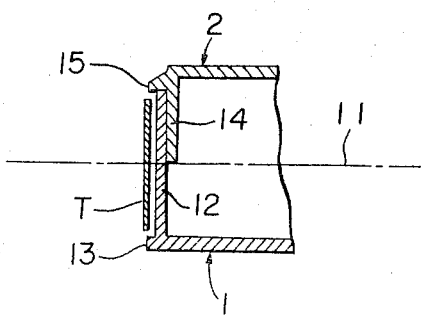
FIG. 4 is an enlarged sectional view of a guide rib of the tape cassette of FIG. 3.

FIGS. 3 and 4 show an embodiment of a video tape cassette of the present invention wherein a lower casing (1) and an upper casing (2) have the same structures as those of FIG. 1 except for the front part.

According to the present invention, a guide rib (12) of the lower casing (1) vertically extends toward a bead (15) of a guide rib (14) of the upper casing (2) to closely fit to the bead and a bead (13) is formed at the lower edge of the guide rib (12) as shown in FIG. 4. The guide rib (14) of the upper casing (1) comprises the bead (15) and a wall surface providing contact with surface of the guide rib (12) of the lower casing (1). The lower edge of the guide rib (14) terminates at or near the central plane (11).

In the structure of the tape cassette of the invention, the rear surface of the guide rib (12) of the lower casing is supported by the guide rib (14) of the upper casing whereby the guide surface can be maintained vertically and can be reinforced mechanically. The top of the guide rib (12) of the lower casing is directly touching the bead (15) of the upper casing. Accordingly, no connecting part or mating line is formed on the surface of the guide rib (12) thereby permitting a smooth guiding of the magnetic tape. It is very important that the tape cassette can be easily assembled and no problem of biting, snagging or pinching the magnetic tape is caused.

As shown in FIG. 4, the width of the guide rib (12) of the lower casing is slightly larger than that of the magnetic tape. Accordingly, when a part of the magnetic tape is drawn from the lower casing (1) after its having been wound on the hub in the lower casing, the magnetic tape makes contact with the guide rib (12) in the position lower than the top (16) of the guide rib (12).

It is evident that no interference of the upper casing with the magnetic tape is caused in assembling the upper casing (2) and the lower casing (1).

In accordance with the present invention, the guiding surface has no mating part thereby permitting the magnetic tape to smoothly pass and the assembling operation of the casings can be easily performed without damaging the magnetic tape.

It is clear that various modifications can be made within the scope of the invention. For example, the invention is also applicable to ordinary magnetic tape cassettes in which the magnetic tape is guided to the outsicde of the tape cassette.

We claim:

1. A guide member of a tape cassette assembly having an upper casing and a lower casing wherein a magnetic tape is guided outside the casings from the front parts to pass in front of a hollow channel-like guide rib, said guide member comprising:

at least one guide rib vertically extending from the lower casing to the upper casing forming a supporting surface for the entire width of the magnetic tape; and at least one guide rib vertically extending from the upper casing along the rear surface of the guide rib of the lower casing for supporting the guide rib of the lower casing such that the tape cassette is free from snagging the magnetic tape when the upper casing is assembled on the lower casing.

2. A tape cassette according to claim 1, wherein the top portion of the guide rib of the lower casing is fitted to the bead of the upper casing.

3. A tape cassette according to claim 1 wherein the guide rib of the upper casing extends along the guide rib of the lower casing so as to provide mutual surface contact.

4. A tape cassette according to claim 1 wherein the guide rib of the upper casing extends to at least a central plane of the tape cassette.

5. A tape cassette according to claim 1, said at least one guide rib vertically extending from the lower casing comprising a pair of guide ribs and said at least one guide rib vertically extending from the upper casing comprising a pair of guide ribs.

* * * * *